United States Patent Office 3,064,009
Patented Nov. 13, 1962

3,064,009
O-COUMARYL O-ALKYL PHOSPHORAMIDATES AND PHOSPHORAMIDOTHIOATES
Raymond H. Rigterink, Midland, Mich., assignor to The Dow Chemical Company, Midland, Mich., a corporation of Delaware
No Drawing. Filed May 5, 1961, Ser. No. 107,904
8 Claims. (Cl. 260—343.2)

The present invention is directed to the phosphoramidates and phosphoramidothioates corresponding to the formula

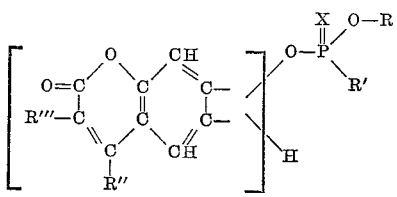

In this and succeeding formulae, X represents oxygen or sulfur, R represents lower alkyl, R' represents amino or lower alkylamino, R" represents hydrogen or lower alkyl and R'" represents hydrogen, chlorine or bromine. In the present specification and claims, the expression "lower alkyl" is employed to refer to the alkyl radicals containing from 1 to 5 carbon atoms, inclusive. These compounds are liquid or crystalline materials which are somewhat soluble in many common organic solvents and of very low solubility in water. The compounds are useful as parasiticides and herbicides and are adapted to be employed for the control of many mite, insect, plant, bacterial and fungal species such as mites, aphids, beetles, ticks and worms.

The novel compounds of the present invention may be prepared by several methods. In a preferred method, the compounds are prepared by reacting an O-lower alkyl phosphoramidochloridate or phosphoramidochloridothioate corresponding to the formula

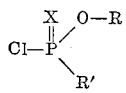

with an alkali metal salt of a hydroxycoumarin corresponding to the formula

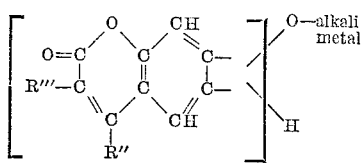

The reaction conveniently is carried out in an organic liquid as reaction medium such as carbon tetrachloride, chloroform, benzene, toluene, isopropyl methyl ketone, or methylene dichloride. The amounts of the reagents to be employed are not critical, some of the desired products being obtained when employing any proportion of the reactants. In the preferred method of operation, good results are obtained when employing substantially equimolecular proportions of the alkali metal salt of the hydroxycoumarine compound and phosphoramidochloridate or phosphoramidochloridothioate. The reaction takes place smoothly at the temperature range of from 5° to 100° C. with the production of the desired product and alkali metal chloride byproduct. In carrying out the reaction, the reactants are mixed and contacted together in any convenient fashion, and the resulting mixture maintained for a period of time in the reaction temperature range to complete the reaction. Following the reaction, the reaction mixture is washed with water and any reaction medium removed by fractional distillation under reduced pressure to obtain the desired product as a residue. This product may be further purified by conventional procedures such as washing with water and dilute aqueous alkali metal hydroxide, solvent extraction and recrystallization.

In an alternative procedure, the new compounds are prepared by reacting an O-lower alkyl phosphorodichloridate or O-lower alkyl phosphorodichloridothioate having the structure

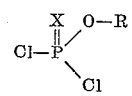

with an alkali metal salt of a coumarin compound as previously defined to form an intermediate diester phosphorochloridate or phosphorochloridothioate having the structure

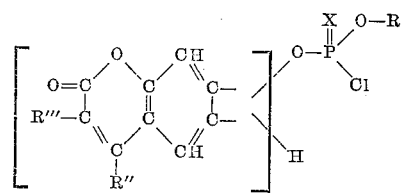

This intermediate is thereafter reacted with ammonia or a lower alkylamine to produce the desired phosphoramidate or phosphoramidothioate product. The reaction conveniently is carried out in a reaction medium such as benzene, chloroform, toluene, isobutyl methyl ketone or carbon tetrachloride. Good results are obtained when employing substantially equimolecular proportions of the O-lower alkyl phosphorodichloridate or phosphorodichloridothioate and alkali metal salt, and at least two molecular proportions of ammonia or alkylamine. The reaction with the alkali metal salt of the hydroxycoumarin compound is carried out at temperatures of from 0° to 70° C. The reaction between the intermediate phosphorochloridate or phosphorochloridothioate and ammonia or lower alkyl amine is somewhat exothermic and takes place at the temperature range of from —10° to 30° C. The temperature may be controlled by regulating the rate of mixing and contacting the reactants together and by external cooling. The byproduct in both steps of the reaction is chloride. In the first step, the chloride appears as alkali metal chloride. In the second step, the chloride appears as the hydrochloride salt of the amine or ammonia reactants. Following the reaction, the desired product may be separated in accordance with conventional procedures as previously described.

The following examples merely illustrate the invention and are not to be construed as limiting.

EXAMPLE 1

*O-(4-Methyl-2-Oxo-2H-1-Benzopyran-7-Yl) O-Methyl N-Diethyl Phosphoramidothioate*

7-hydroxyl-4-methylcoumarin (17.6 grams; 0.1 mole), aqueous 50 percent sodium hydroxide (equivalent to 0.1 mole of NaOH) and 250 milliliters of isobutyl methyl ketone were mixed together and heated at the boiling temperature with stirring to produce the sodium salt of 7-hydroxy-4-methylcoumarin. The heating was carried out with the distillation of some of the reaction medium together with water of reaction as formed. 16.5 grams (0.1 mole) of O-methyl phosporodichloridothioate was added to the above prepared mixture containing the salt. The addition was carried out rapidly and at a temperature of 6° C. Stirring was thereafter continued for one hour as the temperature was allowed to rise to about 25° C. To this mixture was then added portionwise with stirring 14.6 grams (0.2 mole) of diethylamine. The addition was carried out over about 0.5 hour and at a temperature of from 5° to 10° C. Stirring was thereafter continued for one hour as the temperature was allowed to rise to room temperature to complete the reaction. The reaction mixture was then successively washed with aqueous 2 percent sodium hydroxide and water and low boiling constituents removed from the washed mixture by fractional distillation under reduced pressure. The residue was then recrystallized from a petroleum ether boiling at 86° to 100° C. to obtain an O-(4-methyl-2-oxo-2H-1-benzopyran-7-yl) O-methyl N-diethyl phosphoramidothioate product as a crystalline solid melting at 106° to 108° C. and having a sulfur content of 9.36 percent as compared to a theoretical content of 9.39 percent.

EXAMPLE 2

*O-(4-Methyl-2-Oxo-2H-1-Benzopyran-7-Yl) O-Methyl N-Isopropyl Phosphoramidate*

7-hydroxy-methylcoumarin (17.6 grams; 0.1 mole), aqueous 50 percent sodium hydroxide (equivalent to 0.1 mole of NaOH) and 250 milliliters of isobutyl methyl ketone were mixed together and heated at the boiling temperature as previously described to prepare the sodium salt of the 7-hydroxy-4-methylcoumarin. O-methyl phosphorodichloridate (14.9 grams; 0.1 mole) was added dropwise with stirring to the above mixture containing the sodium salt. The addition was carried out at a temperature of −40° C. and over a period of about 5 minutes. Stirring was thereafter continued for one hour as the temperature of the reaction mixture was allowed to rise to 0° C. To this mixture was then added with stirring 11.8 grams (0.2 mole) of isopropylamine. The addition was carried out in about 5 minutes and at a temperature of from −5° to 0° C. Stirring was thereafter continued for one hour as the temperature rose to 25° C. The reaction mixture was then filtered and the reaction medium removed from the filtrate by vacuum distillation to obtain an O-(4-methyl-2-oxo-2H-1-benzopyran-7-yl) O-methyl N-isopropyl phosphoramidate product as a liquid residue. This product had a refractive index $n/D$ of 1.5248 at 25° C. and a phosphorus content of 9.99 percent as compared to a theoretical content of 9.96 percent.

EXAMPLE 3

*O-(4-Methyl-2-Oxo-2H-1-Benzopyran-6-Yl) O-Sec.Butyl N-Methyl Phosphoramidothioate*

6-hydroxy-4-methylcoumarin (17.6 grams; 0.1 mole), aqueous 50 percent sodium hydroxide (equivalent to 0.1 mole of NaOH), 250 milliliters of benzene and 50 milliliters of dimethyl formamide were mixed together and heated at the boiling temperature as previously described to prepare the sodium salt of the 6-hydroxy-4-methylcoumarin. O-sec.butyl N-methyl phosphoramidochloridothioate (20.2 grams; 0.1 mole) was added rapidly with stirring and at a temperature of 28° C. to the above mixture containing the sodium salt. Stirring was thereafter continued and the temperature of the mixture raised to and maintained at from 60° to 65° C. for two hours to insure completion of the reaction. The reaction mixture was then washed with water and low boiling constituents removed from the washed mixture by distillation under reduced pressure to obtain an O-(4-methyl-2-oxo-2H-1-benzopyran-6-yl) O-sec.butyl N-methyl phosphoramidothioate product as a liquid residue having a refractive index $n/D$ of 1.5142 at 25° C.

EXAMPLE 4

*O-(3-Bromo-4-Methyl-2-Oxo-2H-1-Benzopyran-7-Yl) O-Methyl N-Methyl Phosphoramidothioate*

3-bromo-7-hydroxy-4-methylcoumarin (17.8 grams; 0.07 mole), aqueous 50 percent sodium hydroxide (equivalent to 0.07 mole of NaOH), 250 milliliters of benzene and 50 milliliters of dimethyl formamide were mixed together and heated at the boiling temperature in the usual manner to prepare the sodium salt of the 3-bromo-7-hydroxy-4-methylcoumarin. O-methyl N-methyl phosphoramidochloridothioate (11.2 grams; 0.07 mole) was added rapidly with stirring and at a temperature of 26° C. to the above mixture containing the salt. Stirring was thereafter continued and the mixture heated to and maintained at from 60° to 65° C. for 2.5 hours to insure completion of the reaction. The reaction mixture was then successively washed with water and low boiling constituents removed from the washed product by distillation under reduced pressure to obtain an O-(3-bromo-4-methyl-2-oxo-2H-1-benzopyran-7-yl) O-methyl N-methyl phosphoramidothioate product as a liquid residue having a refractive index $n/D$ of 1.5968 at 25° C.

In a similar manner, other products of the present invention are prepared as follows:

O-(4-methyl-2-oxo-2H-1-benzopyran-7-yl) O-methyl N-sec.butyl phosphoramidothioate ($n/D$ of 1.5482 at 25° C.) by reacting the potassium salt of 7-hydroxy-4-methylcoumarin and O-methyl N-sec.butyl phosphoramidochloridothioate.

O-(3-chloro-4-methyl-2-oxo-2H-1-benzopyran-7-yl) O-methyl N-methyl phosphoramidothioate ($n/D$ of 1.5987 at 25° C.) by reacting together the potassium salt of 7-hydroxy-3-chloro-4-methylcoumarin and O-methyl N-methyl phosphoramidochloridothioate.

O-(3-chloro-4-methyl-2-oxo-2H-1-benzopyran-7-yl) O-methyl N-dimethyl phosphoramidate by reacting together the potassium salt of 7-hydroxy-3-chloro-4-methylcoumarin and O-methyl N-dimethyl phosphoramid_chloridate.

O-(3-chloro-4-methyl-2-oxo-2H-1-benzopyran-7-yl) O-methyl N-isopropyl phosphoramidothioate ($n/D$ of 1.5706 at 25° C.) by racting together the sodium salt of 7-hydroxy-3-chloro-4-methylcoumarin, O-methyl phosphorodichloridothioate and isopropylamine.

O-(2-oxo-2H-1-benzopyran-7-yl) O-methyl N-methyl phosphoramidothioate ($n/D$ of 1.5782 at 25° C.) by reacting together the sodium salt of 7-hydroxycoumarin and O-methyl N-methyl phosphoramidochloridothioate.

O-(4-methyl-2-oxo-2H-1-benzopyran-6-yl) O-ethyl N-dimethyl phosphoramidate by reacting together the sodium salt of 6-hydroxy-4-methylcoumarin and O-ethyl N-dimethyl phosphoramidochloridate.

O-(3-chloro-4-methyl-2-oxo-2H-1-benzopyran-7-yl) O-ethyl N-ethyl phosphoramidothioate ($n/D$ of 1.5596 at 25° C.) by reacting together the sodium salt of 7-hydroxy-3-chloro-4-methylcoumarin and O-ethyl N-ethyl phosphoramidochloridothioate.

O-(3-chloro-4-methyl-2-oxo-2H-1-benzopyran-7yl) O-isopropyl N-isopropyl phosphoramidothioate ($n/D$ of 1.5495 at 25° C.) by reacting together the sodium salt of 7-hydroxy-3-chloro-4-methylcoumarin and O-isopropyl N-isopropyl phosphoramidochloridothioate.

O-(3-bromo-4-methyl-2-oxo-2H-1-benzopyran-6-yl) O-amyl N-dibutyl phosphoramidate by reacting together the sodium salt of 6-hydroxy-3-bromo-4-methylcoumarin and O-amyl N-dibutyl phosphoramidochloridate.

O-(3-chloro-4-methyl-2-oxo-2H-1-benzopyran-7-yl) O-isobutyl N-methyl phosphoramidothioate ($n/D$ of 1.5561 at 25° C.) by reacting together the sodium salt of 7-hydroxy-3-chloro-4-methylcoumarin and O-isobutyl N-methyl phosphoramidochloridothioate.

O-(2-oxo-2H-1-benzopyran-6-yl) O-amyl N-dipropyl phosphoramidothioate by reacting together the sodium salt of 6-hydroxycoumarin and O-amyl N-dipropyl phosphoramidochloridothioate.

O-(3-chloro-4-methyl - 2 - oxo-2H-1-benzopyran-7-yl) O-butyl N-butyl phosphoramidothioate (n/D of 1.5158 at 25° C.) by reacting together the sodium salt of 7-hydroxy-3-chloro-4-methylcoumarin and O-butyl N-butyl phosphoramidochloridothioate.

O-(3-chloro - 4 - methyl-2-oxo-2H-1-benzopyran-7-yl) O-methyl N-methyl phosphoramidate (n/D of 1.5518 at 25° C.) by reacting together the sodium salt of 7-hydroxy-3-chloro-4-methylcoumarin, O-methyl phosphorodichloridate and methylamine.

O-(4-methyl - 2 - oxo-2H-1-benzopyran-6-yl) O-methyl N-diamyl phosphoramidate by reacting together the sodium salt of 6-hydroxy-4-methylcoumarin and O-methyl N-diamyl phosphoramidochloridate.

The new compounds of the present invention have been found to be useful as herbicides and parasiticides for the control of a number of plant, mite, insect and bacterial and fungal organisms. For such use, the products are dispersed on a finely divided solid and employed as dusts. Also, such mixtures may be dispersed in water with or without the aid of a surface active dispersing agent and the resulting aqueous suspensions employed as sprays. In other procedures, the products are employed as constituents in solvent solutions, water-in-oil or oil-in-water emulsions or aqueous dispersions. In representative operations, aqueous compositions containing 500 parts per million by weight of O-(3-chloro-4-methyl-2-oxo-2H-1-benzopyran-7-yl) O-methyl N-methyl phosphoramidothioate give 100 percent controls of mites, *Rhizoctonia solani*, Cabomba and Daphnia.

The 6-hydroxycoumarin and 7-hydroxycoumarin type compounds employed as starting materials in accordance with the teachings of the present invention may be prepared by known procedures. Thus, 6-hydroxycoumarin is prepared by the condensation of hydroquinone and malic acid, while 7-hydroxycoumarin is prepared by the condensation of resorcinol and malic acid. The 4-alkyl-6-hydroxycoumarins and 3-halo-4-alkyl-6-hydroxycoumarins are prepared by the condensation of hydroquinone and a methyl alkanoylacetate or methyl α-haloalkanoylacetate. Similarly, the 4-alkyl-7-hydroxycoumarins and 3-halo-4-alkyl-7-hydroxycoumarins are prepared by the condensation of resorcinol and ethyl alkanoylacetate or ethyl α-haloalkanoylacetate.

I claim:
1. A compound corresponding to the formula

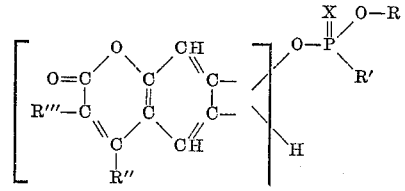

wherein X represents a member of the group consisting of oxygen and sulfur, R represents lower alkyl, R' represents a member of the group consisting of amino and lower alkylamino, R" represents a member of the group consisting of hydrogen and lower alkyl and R''' represents a member of the group consisting of hydrogen, chlorine and bromine.

2. O-(3-chloro-4-methyl - 2 - oxo-2H-1-benzopyran-7-yl) O-methyl N-methyl phosphoramidothioate.

3. O-(4-methyl-2-oxo-2H-1-benzopyran-7-yl) O-methyl N-sec.butyl phosphoramidothioate.

4. O-(3-chloro - 4 - methyl-2-oxo-2H-1-benzopyran-7-yl) O-methyl N-isopropyl phosphoramidothioate.

5. O-(4-methyl-2-oxo-2H-1-benzopyran-7-yl) O-methyl N-isopropyl phosphoramidate.

6. O-(3-chloro-4-methyl - 2 - oxo-2H-1-benzopyran-7-yl) O-methyl N-methyl phosphoramidate.

7. O-(3-chloro - 4 - methyl-2-oxo-2H-1-benzopyran-7-yl) O-isobutyl N-methyl phosphoramidothioate.

8. O-(4-methyl-2-oxo-2H-1-benzopyran-7-yl) O-methyl N-diethyl phosphoramidothioate.

No references cited.